(12) United States Patent
Odom

(10) Patent No.: US 9,088,529 B2
(45) Date of Patent: *Jul. 21, 2015

(54) DISTRIBUTED MULTIPLE-TIER TASK ALLOCATION

(71) Applicant: Coho Licensing LLC, Wilmington, DE (US)

(72) Inventor: Gary Odom, Roseburg, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/194,939

(22) Filed: Mar. 3, 2014

(65) Prior Publication Data

US 2014/0317292 A1    Oct. 23, 2014

Related U.S. Application Data

(63) Continuation of application No. 13/422,411, filed on Mar. 16, 2012, now Pat. No. 8,667,065, which is a continuation of application No. 13/208,404, filed on Aug. 12, 2011, now Pat. No. 8,166,096, which is a continuation of application No. 10/228,588, filed on Aug. 26, 2002, now Pat. No. 8,024,395.

(60) Provisional application No. 60/317,108, filed on Sep. 4, 2001.

(51) Int. Cl.
*G06F 15/173* (2006.01)
*G06F 15/16* (2006.01)
*H04L 12/911* (2013.01)
*G06F 9/50* (2006.01)

(52) U.S. Cl.
CPC .............. *H04L 47/78* (2013.01); *G06F 9/5072* (2013.01); *G06F 2209/509* (2013.01); *G06F 2209/5017* (2013.01)

(58) Field of Classification Search
CPC ................................. H04L 47/70; G06F 9/50
USPC .......................................... 709/203, 224–226
See application file for complete search history.

(56) References Cited

U.S. PATENT DOCUMENTS

| 3,662,401 | A | 5/1972 | Collins et al. |
| 5,025,369 | A | 6/1991 | Schwartz |
| 5,815,793 | A | 9/1998 | Ferguson |
| 6,098,091 | A | 8/2000 | Kisor |
| 6,112,225 | A | 8/2000 | Kraft et al. |
| 6,148,323 | A | 11/2000 | Whitner |
| 6,167,427 | A | 12/2000 | Rabinovich et al. |

(Continued)

OTHER PUBLICATIONS

Kao, "Subtask deadline assignment for complex distributed soft realtime tasks", Proceedings of the 14th International Conference on Distributed Computing Systems, 1994; Jun. 21-24, 1994; pp. 172-181, USA.

(Continued)

*Primary Examiner* — Minh-Chau Nguyen

(74) *Attorney, Agent, or Firm* — Ferraiuoli LLC

(57) ABSTRACT

Described is a system and methods for multiple tier distribution of task portions for distributed processing. Essentially, a task is divided into portions by a first computer and a task portion transferred to second participatory computer on the network, whereupon an allocated task portion is again portioned by the second computer into subtask portions, and a subtask portion transferred by the second computer to a third participatory computer on the network, whereby distributed processing transpires, and results collated as required.

10 Claims, 6 Drawing Sheets

(56) References Cited

U.S. PATENT DOCUMENTS

| | | |
|---|---|---|
| 6,192,388 B1 | 2/2001 | Cajolet |
| 6,263,358 B1 | 7/2001 | Lee et al. |
| 6,370,560 B1 | 4/2002 | Robertazzi et al. |
| 6,418,462 B1 | 7/2002 | Xu |
| 6,463,457 B1 | 10/2002 | Armentrout et al. |
| 6,775,831 B1 | 8/2004 | Carrasco et al. |
| 6,782,422 B1 | 8/2004 | Bahl et al. |
| 6,826,753 B1 | 11/2004 | Dageville et al. |
| 6,941,365 B2 | 9/2005 | Sirgany |
| 7,013,344 B2 | 3/2006 | Megiddo |
| 7,085,853 B2 | 8/2006 | Volkov et al. |
| 7,103,628 B2 | 9/2006 | Neiman et al. |
| 7,155,722 B1 | 12/2006 | Hilla et al. |
| 7,188,113 B1 | 3/2007 | Thusoo |
| 7,243,121 B2 | 7/2007 | Neiman et al. |
| 7,383,426 B2 | 6/2008 | Chung et al. |
| 7,647,593 B2 | 1/2010 | Matsumoto |
| 7,668,800 B2 | 2/2010 | Motoyama et al. |
| 7,693,931 B2 | 4/2010 | Polan |
| 7,835,022 B2 | 11/2010 | Matsumoto |
| 7,849,178 B2 | 12/2010 | Shen et al. |
| 7,936,469 B2 | 5/2011 | Gregory |
| 2003/0028640 A1 | 2/2003 | Malik |
| 2003/0028645 A1 | 2/2003 | Romagnoli |
| 2003/0050955 A1 | 3/2003 | Eatough et al. |
| 2003/0061264 A1 | 3/2003 | Benhase et al. |
| 2003/0158887 A1 | 8/2003 | Megiddo |
| 2004/0045002 A1 | 3/2004 | Berger et al. |
| 2004/0264503 A1 | 12/2004 | Draves |
| 2008/0216859 A1 | 9/2008 | Chan |
| 2009/0204470 A1 | 8/2009 | Weyl et al. |

OTHER PUBLICATIONS

Lee, "Some simple task assignment problems for distributed networked agents", Fourth International Conference on Knowledge-based Intelligent Engineering Systems and Allied Technologies, 2000. Proceedings. vol. 1, Aug. 30-Sep. 1, 2000 pp. 305-308, USA.

Carl A. Waldspurguer, et al., "Spawn: A Distributed Computational Economy," Dynamics of Computation Group (1991).

| 60 (SUB)TASK PORTION | 61 MESSAGE TYPE | 62 DATA | 63 CODE | 64 STATUS / DIRECTIVE | 65 RESULTS |
|---|---|---|---|---|---|
| IDENTIFIABLE BY DIVISION | ACTION-SPECIFIC (E.G. ALLOCATE, CANCEL, RESULT, COLLATE) | (SUB)TASK DATA OR DATA REFERENCE | SOFTWARE OR SW REFERENCE | DEPENDS ON MESSAGE TYPE | DEPENDS ON MESSAGE TYPE |

DISTRIBUTED MULTIPLE-TIER TASK ALLOCATION

CROSS-REFERENCE TO RELATED APPLICATIONS

This application is a continuation of U.S. patent application Ser. No. 13/422,411, filed Mar. 16, 2012, which is a continuation of U.S. patent application Ser. No. 13/208,404, filed Aug. 12, 2011, now U.S. Pat. No. 8,166,096, which is a continuation of U.S. patent application Ser. No. 10/228,588, filed Aug. 26, 2002, now U.S. Pat. No. 8,024,395, which claims priority benefit under 35 U.S.C. §119(e) of U.S. Provisional Application No. 60/317,108, filed Sep. 4, 2001.

STATEMENT REGARDING FEDERALLY SPONSORED RESEARCH OR DEVELOPMENT

N/A

THE NAMES OF THE PARTIES TO A JOINT RESEARCH AGREEMENT N/A

INCORPORATION-BY-REFERENCE OF MATERIAL SUBMITTED ON A COMPACT DISC

N/A

BACKGROUND OF THE DISCLOSURE

1. Field of the Disclosure

The relevant technical field is computer software, specifically distributed processing in a networked environment.

2. Description of the Related Art Including Information Disclosed Under 37 CFR 1.97 and 1.98

In what is not ironically called a "network effect", the advantage of distributed processing is positively correlated to availability of powerful computers in a networked environment. This trend is especially encouraged by always-on broadband connection to the ultimate wide-area network: the Internet.

U.S. Pat. No. 6,192,388 details "detecting available computers to participate in computationally complex distributed processing problems", and switching an allocated task portion to a different computer if the one first assigned the task portion becomes occupied. U.S. Pat. No. 6,192,388 also describes some of the resource factors involved in determining whether to allocate a task portion to a computer.

With some content overlap to the earlier-filed U.S. Pat. No. 6,192,388, U.S. Pat. No. 6,112,225 describes a "task distribution processing system and the method for subscribing computers to perform computing tasks during idle time", and goes into detail as to various ways of specifying "idle time". Both U.S. Pat. Nos. 6,192,388 and 6,112,225, incorporated herein by reference, use the same computer for allocating, monitoring and re-allocating task portions.

U.S. Pat. No. 6,263,358 describes sophisticated regimes of scheduling of distributed processing tasks using software agents. In the face of schedule slippage, such a system relies upon coordination among multiple agents to work effectively.

U.S. Pat. No. 6,370,560 discloses "a load sharing system . . . . A controller divides a divisible load or task and assigns each segment of the load or task to a processor platform based on the processor platform's resource utilization cost and data link cost."

BRIEF SUMMARY OF THE DISCLOSURE

Multiple tier task allocation maximizes flexibility and productivity of distributed processing participatory computers.

A computer which has been allocated a distributed processing task portion may itself determine to reallocate a portion of its subtask, for example, in order to meet a schedule, or if its performance profile deteriorates below expectation. The described technology localizes further (sub)task portion allocation control to computers having been assigned task portions.

Further task processing division to other computers on the network may be extended to initial task portioning, scheduling, and results collation.

Admittedly, only those tasks capable of being subdivided in some manner may benefit from the described technology.

DETAILED DESCRIPTION OF THE DISCLOSURE

Figure 1:
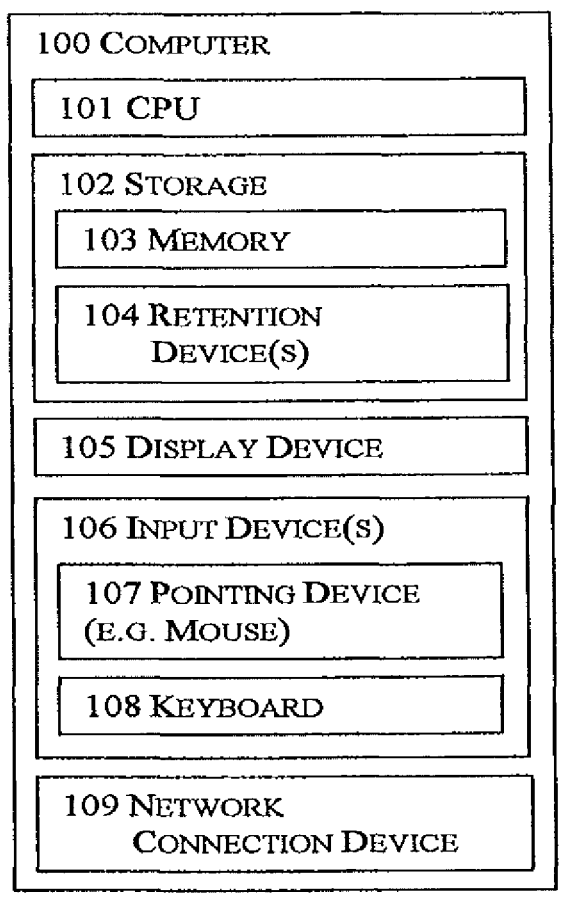
FIG. 1 is a block diagram of a suitable computer.
Figure 2:
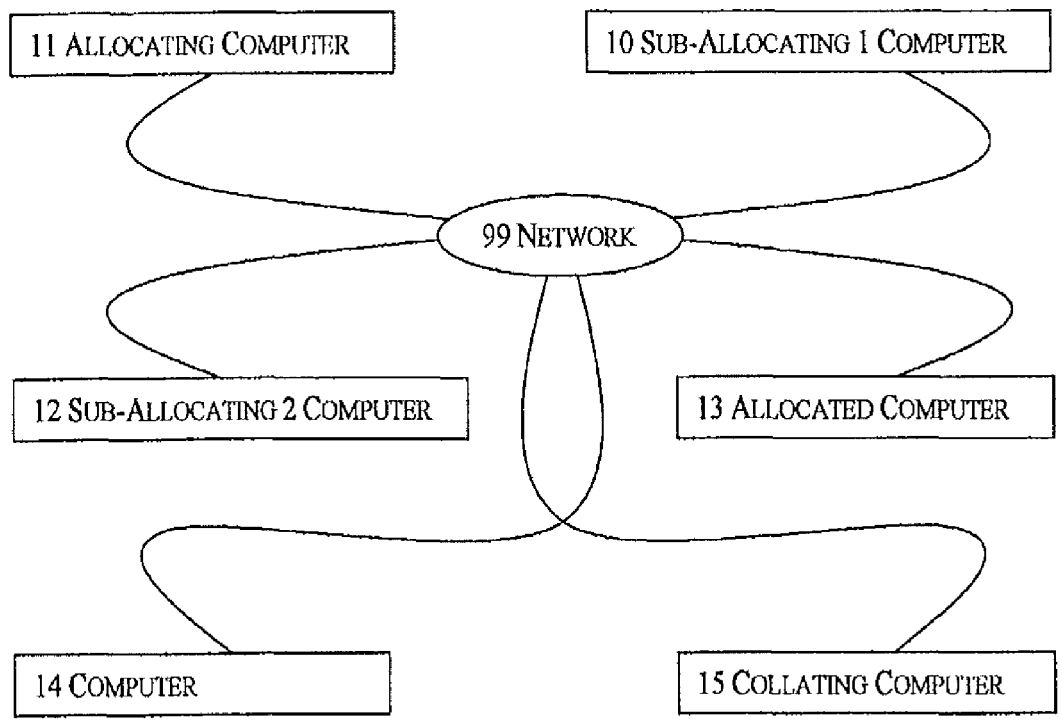
FIG. 2 depicts an example computer network.

FIG. 1 is a block diagram of a computer 100 which comprises at least a CPU 101; storage 102, which comprises memory 103 and optionally one or more devices with retention medium(s) 104 such as hard disks, diskettes, compact disks (e.g. CD-ROM), or tape; a device 109 for connection to a network 99; an optional display device 105; and optionally one or more input devices 106, examples of which include but are not exclusive to, a keyboard 108, and/or one or more pointing devices 107, such as a mouse. Such a computer 100 is suitable for the described technology, FIG. 2 is a block diagram of distributed processing participatory computers 100 connected to each other through a network 99. Computers 100 are participatory based upon having installed required software and, optionally, meeting specified conditions for participation. Example conditions include sufficient processing power, storage, network bandwidth or reliability, or adequate security precautions, such as a particular installed operating system.

Figure 6:
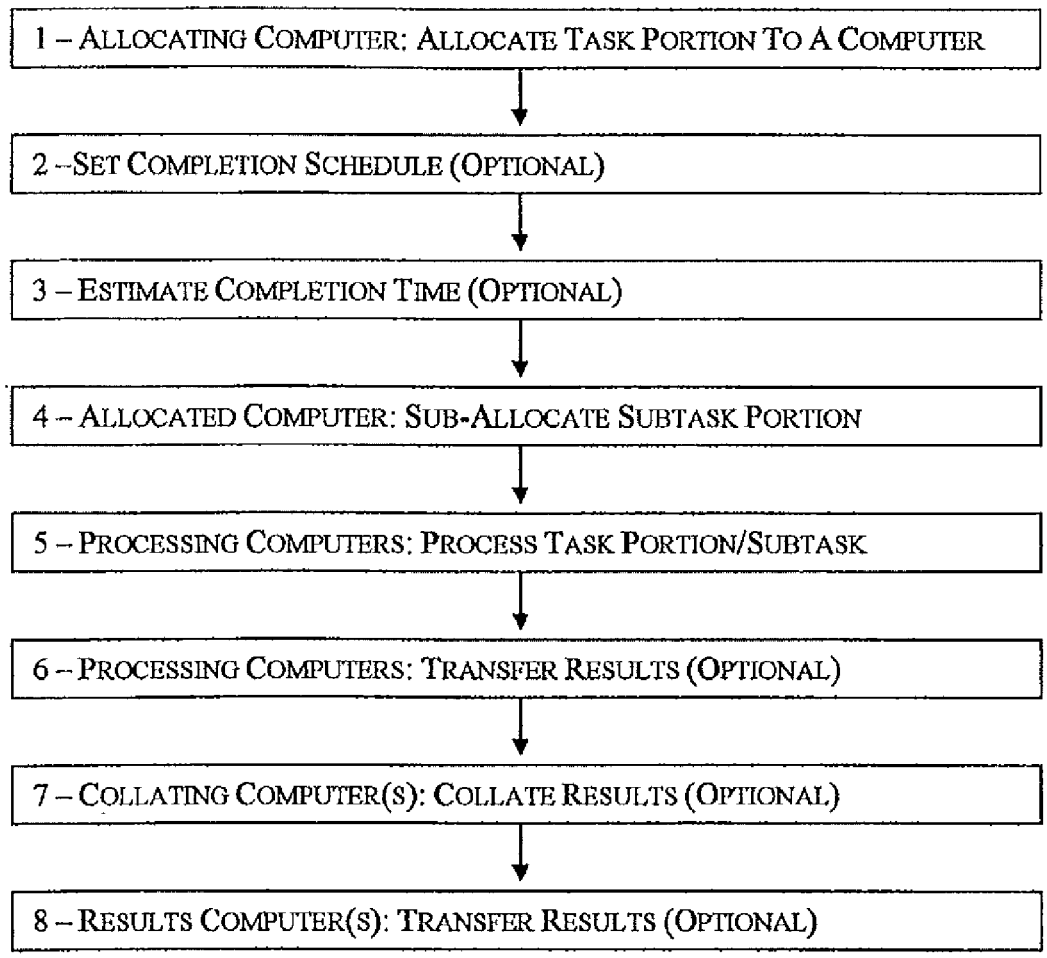
FIG. 6 depicts distributed processing steps.

Computer 11 in FIG. 2 is depicted in the role of an allocating computer, signifying initial allocation of task portions. Likewise, other computers in FIG. 2 are signified by their roles. FIGS. 2, 6, and 7 are used for example explanation of the technology. The roles of computers are envisioned as transitory: for example, a computer initiating distributed processing and allocating task portions for its task may next have a task or sub-task portion allocated to it by another computer in a succeeding task.

A network 99 may be any means by which computers are connected for software program or data transfer. The described technology relies upon network connectivity, including inter-application messaging and data or software transfer capabilities that are well known.

Participatory computers have software installed enabling the desired distributed processing. The software may be installed by download through network 99 connection, or via a more traditional local retention medium, such as CD-ROM or floppy disk.

The desired distributing processing may take various forms. FIG. 3 illustrates examples.

Figure 3A:
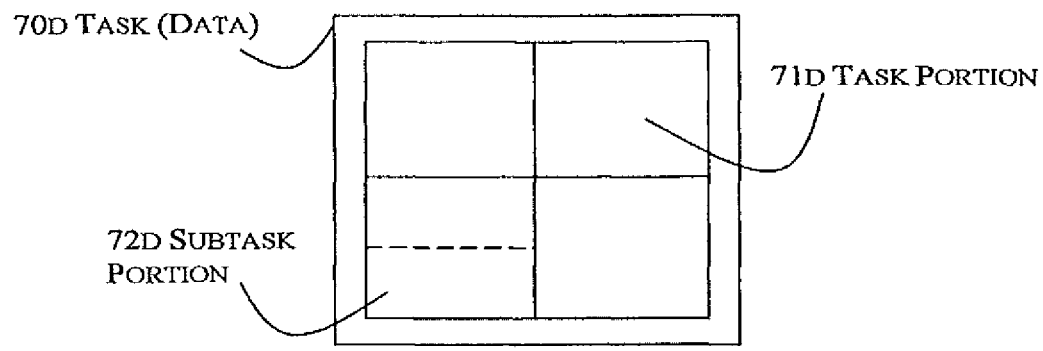
FIG. 3A depicts example tasks.

One example is a divisible and distributable chunk of data requiring a single processing, as depicted in FIG. 3A, split into portions so that the various participatory computers can process the data portions. The task data 70D is shown portioned into equal quarter task portions 71D. A task portion has been further split into subtask portions 72D.

Figure 3B:
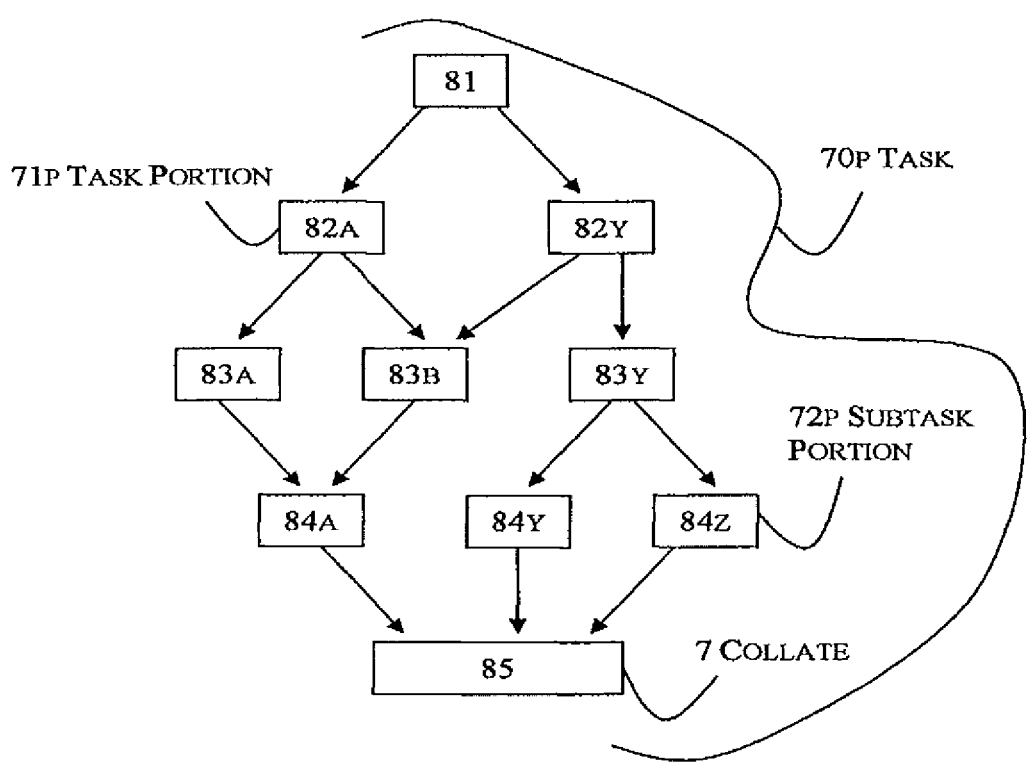
FIG. 3B depicts example tasks.

An example at the other end of the spectrum, depicted in FIG. 3B, is a series of processing steps which to some extent may overlap, whereby each of the participatory computers performs some portion of the task 70. Task 70P processing can be portioned into task portions 71P (82A-84A and 82Y-84Y/Z). Further, a subtask portion 72P could be allocated at specific processing steps (83A/B or 84Y/Z). Note that synchronization may be an issue, such as in FIG. 3B where processing step 83B requires the output of preceding steps 82A and 82Y to proceed, There may also be a results collation 85 step. Between the extreme examples lies divisible and distributable data capable of being processed in an overlap (not exclusively serial) manner.

One possible employment scenario for the described technology is a set of participatory computers running one or more applications which intermittently require intermittent excessive (to a single computer) processing. Distributed processing may be used as a remedy for those times when a singular computer may otherwise bog down or be insufficient. In this scenario, any computer with excessive processing needs may initiate shared task processing, either by direct allocation of task portions, or by directing another computer to perform task portion allocation and attendant processing.

Note that the term "allocate" and its conjugations may refer to initial allocation or subsequent sub-allocation—after all, the allocation process is self-similar. In the preferred embodiment, allocation (and sub-allocation) necessarily implies portioning of a (sub)task prior to transferring a portion to another computer. In an alternative embodiment, depicted in FIG. 7D, a task or (sub)task portion may be (sub-)allocated by transfer 90 of the (sub)task to another computer 10 prior to any portioning by the initially transferring computer 11, with a request or directive that a portion be (sub-)allocated 91 to the computer 11 initiating the transfer, thus putting the overhead of (sub-)allocation on the recipient 10 rather than the initially transferring computer 11.

Figures 4, 5:
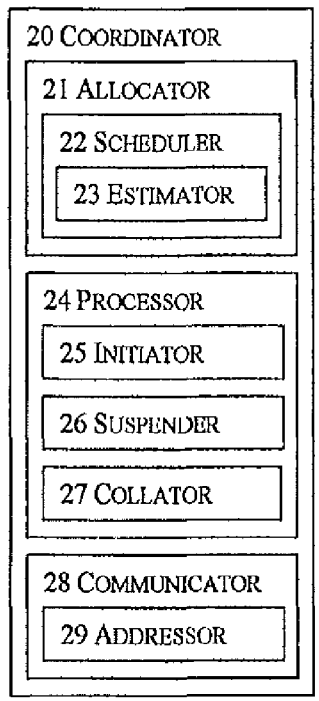
FIG. 4 depicts relevant distributed processing application components.
FIG. 5 depicts an abstract of a distributed processing message.

FIG. 4 depicts an exemplary embodiment of relevant components of a distributed processing program, some of which are optional, depending upon embodiment; other components, such as user interface, event handling, and the actual processing modules, likely exist. Components may have different configurations in different embodiments.

While an application program is used as the preferred embodiment, an alternative preferred embodiment may incorporate all or portions of the described distributed processing functionality in an operating system.

An overall coordinator 20 may be employed to ensure proper interaction between the relevant distributed processing modules. In one embodiment, certain modules may be missing from an application on a particular computer, in which case the coordinator 20 would know the (limited) capabilities of the application, and compensate accordingly. Operationally, that compensation may take the form of knowing, by an addressor 29 with a database tracking such capabilities, of suitable computers with adequate capabilities to take on jobs which a coordinator 20 needs to off-load.

For example, a computer with limited storage or processing power may not have a scheduler 22 or collator 27, whereby a coordinator 20 off-loads those jobs to an appropriate computer. A powerful computer with relative poor network capacity (speed or reliability) may be shunned from communication-intensive jobs, such as collation 7. In this embodiment, the distributed processing application may be heterogeneous, comprising relative capabilities according to computer capacity.

Messages are passed as required, including, for example, the following types of messages 61: (sub)task portion allocation; data 62 or code 63 transfer; cancellation; scheduling: directives or estimation initiation or results; processing: directives (such as initiation, suspension, or collation) and results 65. FIG. 5 depicts an abstract of a distributed processing message; intended for conceptual understanding and suggestion, not specific implementation (as this message format is not particularly efficient). Not all fields shown would necessarily be used for each message type 61, and other fields may be required depending upon message type 61 or embodiment.

(Sub)task portions may be identifiable by its division, such as, for example: 2/5-1/4-2/3, where each set of number indicates a (sub)task division, 2/5, for example, would be part 2 of 5 portions. The point is to allow portioning by an allocator 21 and recombination of results by a collator 27. A table or database may be kept and transferred as necessary that identifies actual and/or possible (sub)task portions.

Data 62 or executable software code 63 or references to them may be transferred via messaging. Status/directive 64 and result 65 depend on message type 61.

Keeping track of processing times of allocated (sub)tasks (including CPU overhead and other performance factors) by computer is recommended as a way to calibrate future allocations.

FIG. 6 outlines the steps for the described multiple tier distributed processing. FIG. 7 illustrates examples of the distribution process.

Figure 7A:
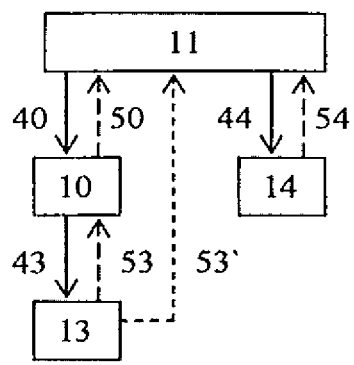
FIG. 7A depicts an example of processing distribution and results collation.

An allocating computer 11 allocates a portion of a task to another computer 10 in step 1. As depicted in FIG. 7A, an allocating computer 11 may allocate task portions to multiple computers (11 and 14). An allocator 21 may be employed for task and subtask portioning and transfer, and for tracking such (sub-)allocations and portions.

Optionally, an allocating 11 (or sub-allocating 10) or allocated 13 computer may set a completion schedule (step 2) for the time by which results should be available. Depending upon the nature of the task, a schedule may be a single completion time for an allocated portion, or for intermediate computations as well. Ostensibly, a schedule is the raison d'être for multiple tier subtask sub-allocation, but subtask sub-allocation may be driven by anticipation of available resources which later fail to appear forthcoming. For example, an allocated computer 13 may become busier than historical usage would indicate, making (sub)task portion offloading prudent.

If scheduling is a factor, an estimated completion time calculation (step 3) is advised. The availability and speed of resources, such as processor(s) 101 and storage 102, may naturally figure into such calculation. Estimation calculations may be done by any participatory computer with sufficient information.

As depicted in FIG. 4, an allocator 21 may employ a scheduler 22, which may employ an estimator 23, to perform processing steps 3 and 2 respectively.

The overhead of distribution may be considered by an estimator 23 or scheduler 22 as a factor in (sub-)allocation. Distribution overhead includes the time and resources to portion and distribute subtask portions, and to collect and collate results. Depending on the network, communication lags may also be a factor. Excessive (sub)task portion (sub-)allocation granularity is conceivable and should be accounted for. A suggested rule is that estimate of (sub-) allocation should be a fraction of estimated processing time if processing time is the bottleneck; storage 102 capacity or other such bottlenecks necessitate similar consideration.

An estimate of processing capability may be ascertained for a computer targeted for processing prior to (sub-)allocation, so as to portion (sub)tasks accordingly.

For whatever reason, in step 4, a computer 10 with an allocated task portion 71 decides to sub-allocate a portion 72 of its allotted subtask to another computer 13, as depicted in FIG. 7A.

Participatory computers with (sub-)allocated (sub)task portions perform required processing per step 5. The generic processor 24 signifies the performer of step 5. An initiator 25 may synchronize with other processors 24 if necessary. A computer may be watchful (a possible coordinator 20 job) and sub-allocate after beginning processing, upon realizing sub-allocation as a prudent measure because of some unanticipated constraint, such as, for example, high CPU utilization (processing overhead) or suddenly limited storage. A suspender 26 may suspend processing, saving state as necessary for later resumption.

Depending upon embodiment, processing may occur only under specified conditions, for example, only when a computer is past a threshold state deemed idle. Other conditions, such as available storage 102, or network 99 connection speed or reliability, may also be pertinent allocation or processing criteria. If processing is conditional, temporary results may be stashed (locally or elsewhere on the network) for later resumption. A processor 24 initiator 25 and suspender 26 may, for example, respectively detect and act upon onset and termination of specified threshold conditions.

Step 6 specifies transferring results. This step may not be necessary, depending upon the task 70. Likewise, in step 7, results are optionally collated by one or more participatory computers, with results monitoring as required. Results monitoring and collation may itself become a distributed task. Collators 27 on multiple computers may collaborate to piece together and conclude the task.

With the notable exception of 53', FIG. 7A depicts results returned to the computer which allocated (or sub-allocated) the task (subtask) portion (50, 53, 54) for collation. But, as shown by example, results may be sent 53' to the allocating computer 11 instead of or in addition to that computer 10 that (sub-)allocated a (sub)task portion.

Figure 7B:
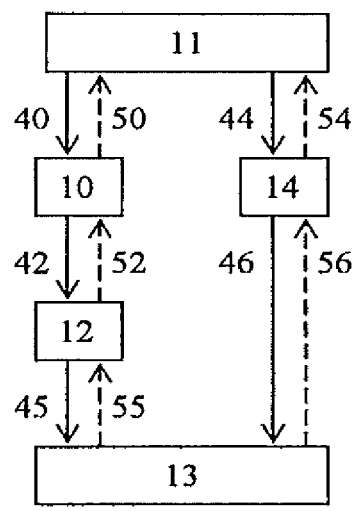
FIG. 7B depicts an example of processing distribution and results collation.
Figure 7C:
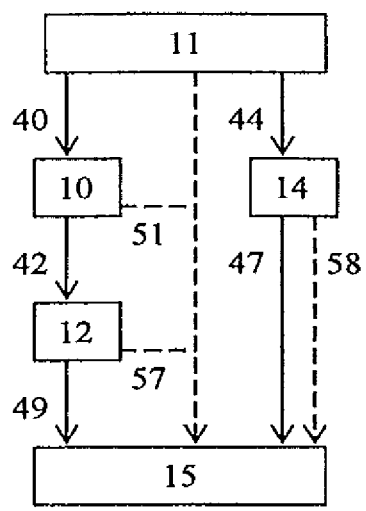
FIG. 7C depicts an example of processing distribution and results collation.
Figure 7D:
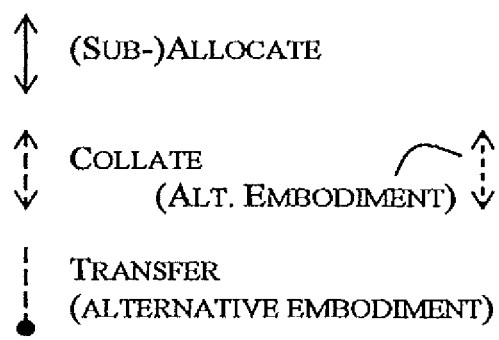
FIG. 7D depicts an example of processing distribution and results collation.
Figure 7D:
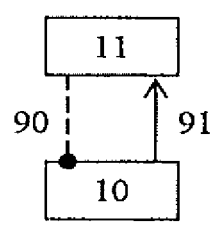

FIG. 7C depicts results being transmitted (likely for collation) to a different computer 15 than the allocating computer 11. This strategy may make sense, for example, when a series of tasks are allocated in succession: a division of duty between an allocating computer 11 and a results-collating computer 15. Final results may be sent to the allocating computer 11 or other computers by the collating computer 15 as necessary.

FIG. 7B depicts a situation where an allocated computer 13 is processing multiple subtask portions allocated by different computers (12, 14). This is doable given identifiable portions as suggested.

Task or subtask portions may be redundantly assigned as a precaution. Redundant (sub)allocation may be sensible given scheduling constraints.

Security may be an issue. Data, results, messages, or other content may be encrypted as required.

What is claimed is:

1. A computer implemented method for distributed processing, comprising the steps of:
   providing an allocating computing device including a first memory and a first processor;
   providing a sub-allocating computing device including a second memory and a second processor;
   providing an allocated computing device including a third memory and a third processor;
   providing a results computing device including a fourth memory and a fourth processor;
   executing by the first processor a first set of instructions stored in the first memory of the allocating computing device to divide a task into a plurality of task portions, at least one first task portion comprising further divisible portions, hereinafter referred to as subtask portions;
   executing by the first processor of a second set of instructions stored in the first memory of the allocating computing device to allocate said first task portion to the sub-allocating computing device via network connectivity;
   executing by the second processor a third set of instructions stored in the second memory of the sub-allocating computing device to await receipt of the first task portion, to divide the first task portion into a plurality of subtask portions, and to allocate at least one said subtask portion to the allocated computing device via network connectivity;
   executing by the third processor of a fourth set of instructions stored in the third memory of the allocated computing device to receive the subtask portion, to process the subtask portion, to produce at least one result related to the subtask portion, and to transfer the result to the results computing device; and
   executing by the fourth processor a fifth set of instructions stored in the fourth memory of the results computing device to await receipt of the results transferred from the allocated computing device as well as other results related to the first task, and to collate all of the received results.

2. The method of claim 1, wherein the sub-allocating computing device is adapted to communicate with the allocated computing regarding subtask allocation prior to allocating the subtask portion to the allocated computer.

3. The method of claim 1, wherein the aid results computing device is adapted to receive redundant results portions.

4. The method of 1, wherein the sub-allocating computing device is adapted to determine the subtask portion allocation by relying partly upon a schedule.

5. The method of claim 1, wherein the allocating computing device and the results computing device comprise the same computing device.

6. The method of claim 1, wherein the network connectivity comprises at least a portion of the internet.

7. The method of claim 1, wherein the allocating computing device comprises a stand-alone computer.

8. The method of claim 1, wherein the sub-allocating computing device comprises a stand-alone computer.

9. The method of claim 1, wherein the allocated computing device comprises a stand-alone computer.

10. The method of claim 1, wherein the results computing device comprises a stand-alone computer.

\* \* \* \* \*